UNITED STATES PATENT OFFICE.

THOMAS EGAN, OF PITTSBURG, PENNSYLVANIA.

COMPOSITION FOR STREETS, SIDEWALKS, &c.

SPECIFICATION forming part of Letters Patent No. 349,304, dated September 21, 1886.

Application filed February 12, 1886. Serial No. 191,753. (No specimens.)

*To all whom it may concern:*

Be it known that I, THOMAS EGAN, a citizen of the United States, and a resident of Pittsburg, in the county of Allegheny and State of Pennsylvania, have invented a new and useful Composition of Matter to be Used in Place of Stone, Brick, or Blocks of Wood, for Paving of Streets, Sidewalks, &c., of which the following is a specification.

My composition consists of the following ingredients, combined in about the proportions named: pitch, one hundred pounds; stone, one hundred and fifty pounds; sand, two hundred pounds; cement, fifty pounds; cinder, twenty-five pounds; sulphur, twenty pounds; air-slaked lime, twenty-five pounds; tar, five pounds; salt, fifteen pounds; gravel, one hundred and eighty pounds.

To prepare my composition for use I first reduce the stone and cinder to the required size. I then add the cement, gravel, sand, sulphur, air-slaked lime, salt, and tar. The pitch, after being brought to a high degree of heat, is added, and the whole thoroughly mingled, when my composition is ready for use. I can apply my composition in the usual manner; but I prefer to mold it into wedge-shaped blocks or blocks of any convenient size, shape, or form.

What I claim, and desire to secure by Letters Patent of the United States, is—

The herein-described composition of matter to be used in covering or paving streets, &c., consisting of pitch, stone, gravel, sand, cement, cinder, sulphur, air-slaked lime, salt, and tar, as specified.

THOMAS EGAN.

Attest:
H. T. MORRIS,
E. J. JOHNSON.